United States Patent [19]

Hearsey

[11] 3,898,259

[45] Aug. 5, 1975

[54] PROCESS FOR PREPARING MONO- AND POLYISOCYANATES

[76] Inventor: Colin John Hearsey, 28 Surbiton Hill Park, Surbiton, Surrey, England

[22] Filed: May 31, 1972

[21] Appl. No.: 258,308

[30] Foreign Application Priority Data
June 1, 1971 United Kingdom............... 18314/71

[52] U.S. Cl........................ 260/453 P; 260/346.1 R
[51] Int. Cl........................................... C07c 119/04
[58] Field of Search................................. 260/453 P

[56] References Cited
UNITED STATES PATENTS
2,773,086  12/1956  Slocombe ........................... 260/453

FOREIGN PATENTS OR APPLICATIONS
1,473,821  2/1967  France

*Primary Examiner*—Lewis Gotts
*Assistant Examiner*—Dolph H. Torrence
*Attorney, Agent, or Firm*—Clelle W. Upchurch

[57] ABSTRACT

An organic isocyanate is prepared by reacting a trisubstituted urea with hydrogen chloride in a solvent for the urea at a temperature below the boiling point of the solvent.

7 Claims, No Drawings

PROCESS FOR PREPARING MONO- AND POLYISOCYANATES

The present invention is concerned with a process for preparing mono- and polyisocyanates from trisubstituted ureas.

The vapour phase decomposition of substituted ureas to give isocyanates is described in several literature references. However, some processes relate to the preparation of isocyanates from substituted ureas in solution. In particular, French Pat. No. 1,473,821 refers to the disadvantages of performing the decomposition of substituted ureas at temperatures above 200°C. and draws attention to the accumulation or unwanted decomposition and/or polymerisation products at such temperatures. The above-mentioned French pat. specification relates to a process in which ureas, particularly trisubstituted ureas, are decomposed at temperatures below 200°C. in a solvent to give isocyanates; the decomposition is optionally performed in the presence of certain catalysts, for example tertiary amines, acetic acid or the like, and the solvent should possess a dielectric constant at 20°C. of below 40 and preferably below 10. The process described in this French patent specification suffers from the disadvantage of giving unsatisfactory yields and of requiring long reaction times (6–35 hours in the specific examples).

It is an object of the present invention to provide a substantially improved process for preparing isocyanates from trisubstituted ureas.

Thus, according to the present invention, there is provided a process for preparing organic mono- or polyisocyanates of the general formula:

$$R(NCO)_n$$

in which R is a substituted or unsubstituted aliphatic, cycloaliphatic, aromatic or heterocyclic radical and $n$ is an integer, wherein a solution in an organic solvent of a trisubstituted mono- or polyurea of the general formula:-

$$R(NHCONR'R'')_n$$

in which R' is a substituted or unsubstituted monovalent aliphatic or aromatic radical and R'' is a substituted or unsubstituted monovalent aliphatic radical or in which R' and R'' together represent a substituted or unsubstituted divalent radical in which at least one of the two carbon atoms adjoining the nitrogen atom of the urea group is aliphatic, is treated with gaseous hydrogen chloride at an elevated temperature.

Typical but not limiting substituent groups in R are nitro, halogen, alkyl and heterocyclic; typical but not limiting substituent groups in R' are nitro, halogen, alkyl, aryl and heterocyclic; and typical but not limiting substituent groups in R'' are nitro, halogen, aryl and heterocyclic.

The reaction of the process of the present invention may be represented by the following equation:

$$R(NHCONR'R'')_n + HCl \rightarrow R(NCO)_n + nR'R''NH_2{}^+Cl^-$$

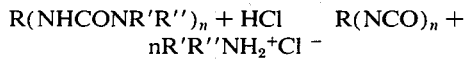

Examples of isocyanates which may be prepared by the process of the present invention include phenyl isocyanate, 3-chlorophenyl isocyanate, 4-chlorophenyl isocyanate, 3,4-dichlorophenyl isocyanate, 4-tolyl isocyanate, 4-nitrophenyl isocyanate, 1-naphthyl isocyanate, benzyl isocyanate, cyclohexyl isocyanate, 1-butyl isocyanate, 1-decyl isocyanate, 3-isocyanato-furan, 1-isocyanatodec-9-ene, p-phenylene diisocyanate, 2,4-toluene diisocyanate, methylene-di-p-phenylene diisocyanate, 1,5-naphthylene diisocyanate, ethylene-di-p-phenylene diisocyanate, 4,4'-stilbene diisocyanate, m-xylylene diisocyanate, 2,5-bis(2-isocyanatoethyl)-furan, isophorone diisocyanate, hexamethylene diisocyanate, 2,2,4-trimethylhexamethylene diisocyanate, 2,6-diisopropylphenyl isocyanate and 1,3-cyclobutane diisocyanate.

By using the process of the present invention, satisfactory yields of isocyanate are obtained with a short reaction time. The yield of isocyanate is normally within the range of 80–90%, somewhat higher yields being possible for monoisocyanates than for polyisocyanates.

The reaction temperature must be selected in consideration of the nature of the trisubstituted urea. In general, the preparation of aliphatic isocyanates requires a higher temperature than the preparation of aromatic isocyanates but in all cases the reaction temperature is preferably within the range 100°–200°C.; the dependence of the preferred reaction temperature on the nature of the urea will become more apparent from the Examples given hereinafter.

The time required for completion of the reaction is dependent upon several factors and may vary between 3 minutes and 1 hour.

An excess of hydrogen chloride is used to ensure complete reaction. An inert gas, such as nitrogen or carbon dioxide, may be passed through the reaction mixture, together with the hydrogen chloride, thereby acting as a gaseous diluent, and it is preferred that the flow of the inert gas be continued for a period after cessation of the passage of hydrogen chloride in order to flush residual hydrogen chloride from the reaction mixture. The latter is particularly important in cases in which the isocyanate displays a marked tendency to enter into reaction with hydrogen chloride to give a carbamoyl chloride.

The dielectric constant of the solvent is not an important factor in the present process and the solvent is selected primarily in consideration of its boiling point, which should be higher than the reaction temperature unless the reaction is carried out under pressure. Furthermore, in order to facilitate the isolation of the isocyanate, the boiling point may advantageously be such as to permit the solvent to be readily separated from the product by distillation. The latter qualification does not apply when the isocyanate is required in solution prior to its subsequent reaction with a further component to form a product. The weight ratio of trisubstituted urea to solvent is preferably within the range of 1:2 to 1:15.

A second amine hydrochloride is formed as a by-product of the reaction. By ensuring its insolubility in the selected solvent in the cold, it may be removed by centrifuging or filtering. Alterntively, the isocyanate may be separated from the amine hydrochloride by solvent extraction following the removal by distillation of the solvent used in the reaction. The free amine may be recovered quantitatively by reaction of the hydrochloride with alkali.

The most successful results are achieved when R is an aryl radical and R' and R'' are saturated aliphatic radicals. For example, the reaction of 1,1'-(methylene-di-p-phenylene)-bis-3,3-di-n-butylurea with hydrogen chloride by the process of the present invention gives methylene-di-p-phenylene diisocyanate (MDI), as is illustrated by the following equation:

allowed to react with dry hydrogen chloride at 150°C. until completion of the reaction (15 minutes). The reaction mixture was then cooled and filtered to remove

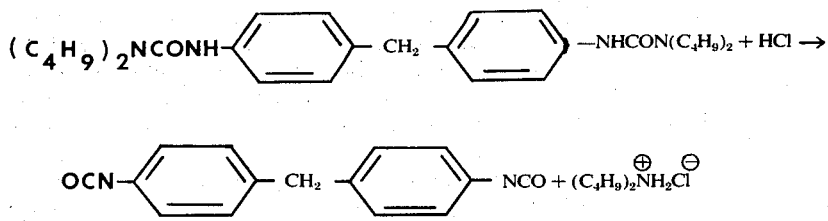

The following Examples are given for the purpose of illustrating the present invention:

EXAMPLE 1

30.0 g. 1,1-diethyl-3-phenylurea were dissolved in 90 g. 1-chloronaphthalene, which had been dried over calcium chloride, in a flask fitted with a reflux condenser. The solution was heated to 130°C. and a mixture of dry gaseous hydrogen chloride and carbon dioxide was passed through the solution until complete conversion of the urea to isocyanate was indicated by infra-red analysis. The time taken to achieve this stage of complete conversion depends on the rate of flow of hydrogen chloride and, in this case, was 10 minutes. At this stage, heating was discontinued and the flow of hydrogen chloride was stopped. The flow of carbon dioxide was then maintained for 25 minutes during cooling, after which the reaction mixture was fractionally distilled to give 16.5 g. phenyl isocyanate, the yield being 89% of theory. The by-product diethylamine hydrochloride was recovered in 99% yield by cooling the solvent and filtering.

EXAMPLE 2

6.0 g. 1,1-diethyl-3-phenylurea were dissolved in 66 g. dry 1,2-dichlorobenzene and allowed to react with hydrogen chloride at 140°C. in the manner described in Example 1. After completion of the reaction (5 minutes) and the passage of carbon dioxide, the solution was cooled in a mixture of solid carbon dioxide and acetone and filtered to remove diethylamine hydrochloride (3.5 g.) in 100% yield. The resulting solution was shown, by conversion to methyl N-phenyl carbamate, to contain 3.2 g. of phenyl isocyanate, indicating a yield of 85% by theory.

EXAMPLE 3

5.0 g. 1,1'-(methylene-di-p-phenylene)-bis-3,3-di-n-butylurea were dissolved in 50 g. dry 1,2-dichlorobenzene. The solution was heated to 150°C. and gaseous hydrogen chloride was passed through the solution until complete conversion of the urea to isocyanate was indicated by infra-red analysis (6 minutes). The solvent was then distilled off under reduced pressure and the residue was extracted with dry petroleum ether at ambient temperature, leaving a small amount of an oily isocyanate-containing residue. The resulting solution was then evaporated to yield 2.1 g. methylene-di-p-phenylene diisocyanate (MDI) (melting point 37°–38°C.) in 85% yield. Di-n-butylamine hydrochloride was recovered in 100% yield.

EXAMPLE 4

4.0 g. 1,1'-(naphthalene-1,5) bis-3,3-di-n-butylurea were dissolved in 40 ml. dry 1,2-dichlorobenzene and di-n-butylamine hydrochloride in 100% yield. After distillation of the solvent, the residue was extracted with warm petroleum ether. The petroleum ether was evaporated to give 2.4 g. 1,5-naphthalene diisocyanate (NDI) (melting point 121°–124°C.) in 86% yield.

In a similar experiment using the corresponding dimethylurea, the product was recrystallised from petroleum ether to give 1,5-naphthalene diisocyanate with a melting point of 129°–131°C., in 79% yield.

EXAMPLE 5

4.8 g. 1,1'-(toluene-2,4) bis-3,3-diethylurea were dissolved in 50 ml. dry monochlorobenzene and heated to 110°C. Dry hydrogen chloride and carbon dioxide were passed through the solution until the reaction was complete (12 minutes). The reaction mixture was then cooled and filtered to remove diethylamine hydrochloride in 100% yield. The solvent was distilled off under reduced pressure and the residue was extracted at ambient temperature with dry petroleum ether. The petroleum ether was then evaporated to give 2.2 g. 2,4-toluene diisocyanate (TDI) (melting point 18°C.) in 84% yield.

EXAMPLE 6

10.0 g. 1-(3,4-dichlorophenyl)-3,3-dimethylurea were dissolved in 100 ml. dry xylene and heated to 135°C. Dry hydrogen chloride was passed through the solution until the reaction was complete (5 minutes). The reaction mixture was then cooled and filtered to remove dimethylamine hydrochloride in 100% yield. The resulting solution was shown, by conversion to isopropyl N-(3,4-dichlorophenyl) carbamate, to contain 7.4 g. 3,4-dichlorophenyl isocyanate, indicating a yield of 92% of theory.

EXAMPLE 7

5.0 g. 1-[3-(3,3-diethylureidomethyl)-3,5,5-trimethylcyclohexyl]-3,3-diethylurea were dissolved in 5.0 g. dry 1,2-dichlorobenzene and heated to 165°C. Dry hydrogen chloride and carbon dioxide were passed through the solution until the reaction was complete (15 minutes). The flow of carbon dioxide was maintained for 30 minutes while the reaction mixture cooled. The precipitated diethylamine hydrochloride was filtered off in 100% yield and the filtrate was distilled under reduced pressure to remove the solvent. The residue was extracted with petroleum ether and the resulting solutions was evaporated to give 2.5 g. 3-isocyanatomethyl-3,5,5-trimethylcyclohexyl isocyanate or isophorone diisocyanate in 83% yield.

EXAMPLE 8

5.0 g. 1,1'-[2,2,4(2,4,4)-trimethylhexamethylene]- bis-3,3-diethylurea were dissolved in dry 1,2-dichlorobenzene and heated to 170°C. By following the procedure described in Example 7, 2.3 g. 2,2,4(2,4,4)-trimethylhexamethylene diisocyanate were obtained in 79% yield.

What we claim is:

1. A method for making an organic isocyanate having the formula $$R(NCO)_n$$

wherein R is an aliphatic, cycloaliphatic, aromatic or hetereocyclic radical and $n$ is an integer of 1 or 2 which comprises passing an excess of gaseous hydrogen chloride through a solution containing a trisubstituted urea having the formula $$R(NHCONR'R'')_n$$

wherein R and $n$ have the same meanings as above, R' is an aliphatic or aromatic radical and R'' is a monovalent aliphatic radical or wherein R' and R'' together represent a divalent radical in which at least one of the two carbon atoms adjoining the nitrogen atom of the urea group is aliphatic, in an organic solvent therefor at a temperature within the range of 100°C. to 200°C. until conversion of the said urea to isocyanate, and thereafter separating the isocyanate from the solvent.

2. A process according to claim 1, wherein the reaction is performed in an atmosphere of inert gas.

3. A process according to claim 2, wherein the inert gas is carbon dioxide or nitrogen.

4. The method of claim 1 wherein the isocyanate is a monoisocyanate.

5. The method of claim 1 wherein the isocyanate is a polyisocyanate.

6. The method of claim 1 wherein the weight ratio of said urea to solvent is from 1:2 to 1:15.

7. The process of claim 1 wherein R is an unsubstituted aromatic radical or a halo, nitro or alkyl substituted aromatic radical and the hydrogen chloride is bubbled through the solution at an elevated temperature.

* * * * *